(12) United States Patent
Justin

(10) Patent No.: US 11,598,486 B2
(45) Date of Patent: Mar. 7, 2023

(54) HYDROGEN DISCHARGE SYSTEM FOR A TRUCK AND TRUCK COMPRISING SUCH SYSTEM

(71) Applicant: Volvo Truck Corporation, Gothenburg (SE)

(72) Inventor: Thomas Justin, Brignais (FR)

(73) Assignee: Volvo Truck Corporation, Gothenburg (SE)

( * ) Notice: Subject to any disclaimer, the term of this patent is extended or adjusted under 35 U.S.C. 154(b) by 347 days.

(21) Appl. No.: 16/754,428

(22) PCT Filed: Oct. 10, 2017

(86) PCT No.: PCT/EP2017/075862
§ 371 (c)(1),
(2) Date: Apr. 8, 2020

(87) PCT Pub. No.: WO2019/072382
PCT Pub. Date: Apr. 18, 2019

(65) Prior Publication Data
US 2020/0340624 A1    Oct. 29, 2020

(51) Int. Cl.
*F17C 7/00*        (2006.01)
*H01M 8/04089*     (2016.01)
*H01M 8/22*        (2006.01)

(52) U.S. Cl.
CPC ........... *F17C 7/00* (2013.01); *H01M 8/04089* (2013.01); *H01M 8/22* (2013.01);
(Continued)

(58) Field of Classification Search
CPC ............... F17C 7/00; F17C 2205/0332; F17C 2205/0352; F17C 2205/0382;
(Continued)

(56) References Cited

U.S. PATENT DOCUMENTS 1,393,825 A * 10/1921 Porharty ................. F16K 31/32
137/39
1,511,162 A * 10/1924 Ganderton ............. F02M 21/00
251/313
(Continued)

FOREIGN PATENT DOCUMENTS

DE    102015015004 A1    5/2017
JP    2004-136828 A      5/2004
(Continued)

OTHER PUBLICATIONS

International Search Report for International Patent Application No. PCT/EP2017/075862, dated Jul. 2, 2018, 8 pages.

*Primary Examiner* — Matthew W Jellett
(74) *Attorney, Agent, or Firm* — Withrow & Terranova, PLLC

(57) ABSTRACT

Hydrogen discharge system for a truck and truck comprising such system The invention concerns a hydrogen discharge system (14) for a truck, this system comprising a pipe (16) provided with at least one discharge opening (162), a deflector (18), that is rotatably mounted with respect to the pipe and that includes a vent, for venting hydrogen exiting through the discharge opening. The system further includes a balancing weight (22) secured to the deflector (18), so as to maintain the deflector in a configuration wherein the vent is facing upwards with respect to the ground, in order to always discharge hydrogen upwards relative to the ground.

15 Claims, 3 Drawing Sheets

(52) U.S. Cl.
CPC ............. *F17C 2205/0332* (2013.01); *F17C 2205/0352* (2013.01); *F17C 2205/0382* (2013.01); *F17C 2221/012* (2013.01); *F17C 2223/0123* (2013.01); *F17C 2260/027* (2013.01); *F17C 2260/042* (2013.01); *F17C 2270/0171* (2013.01); *H01M 2250/20* (2013.01)

(58) Field of Classification Search
CPC ........ F17C 2221/012; F17C 2223/0123; F17C 2260/027; F17C 2260/042; F17C 2270/0171; H01M 8/04089; H01M 8/22; H01M 2250/20; Y02E 60/32; Y02E 60/50
USPC .................... 429/505; 137/38; 224/135 R
See application file for complete search history.

(56) References Cited

U.S. PATENT DOCUMENTS

| | | | | |
|---|---|---|---|---|
| 2,089,640 | A * | 8/1937 | Cotterman | F16K 17/363 477/904 |
| 2,433,405 | A * | 12/1947 | Stamm | F16K 17/36 137/434 |
| 2,460,159 | A * | 1/1949 | White | B60P 3/2255 137/589 |
| 4,041,967 | A * | 8/1977 | Tsukisaka | B62J 37/00 137/39 |
| 4,206,776 | A * | 6/1980 | Bader | F16K 17/36 137/45 |
| 9,682,618 | B2 | 6/2017 | Baik et al. | |
| 2010/0276024 | A1 | 11/2010 | Iida et al. | |
| 2011/0288738 | A1* | 11/2011 | Donnelly | F02D 19/0647 701/99 |
| 2017/0144535 | A1* | 5/2017 | Sonderegger | F17C 13/12 |

FOREIGN PATENT DOCUMENTS

| | | | | |
|---|---|---|---|---|
| JP | 2007-106262 | A | 4/2007 | |
| JP | 6119429 | B2 | 4/2017 | |
| WO | WO-2017188881 | A1 * | 11/2017 | ............. B60K 15/01 |

* cited by examiner

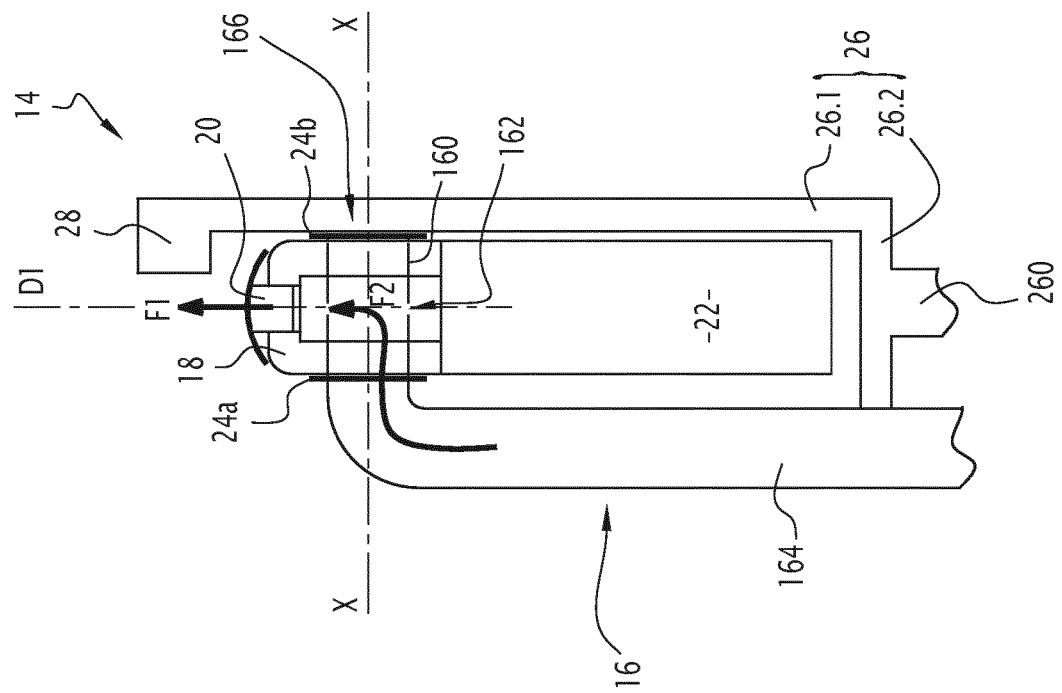
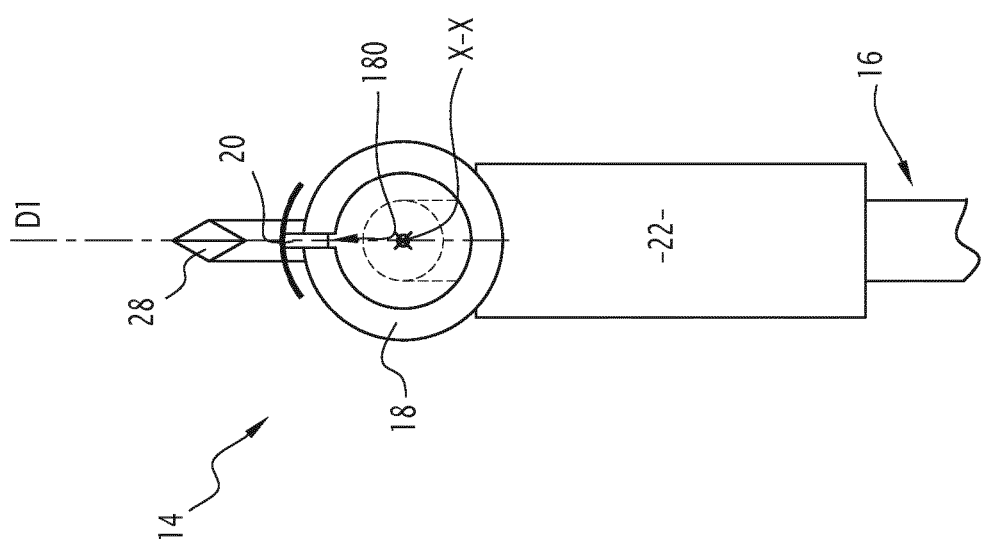

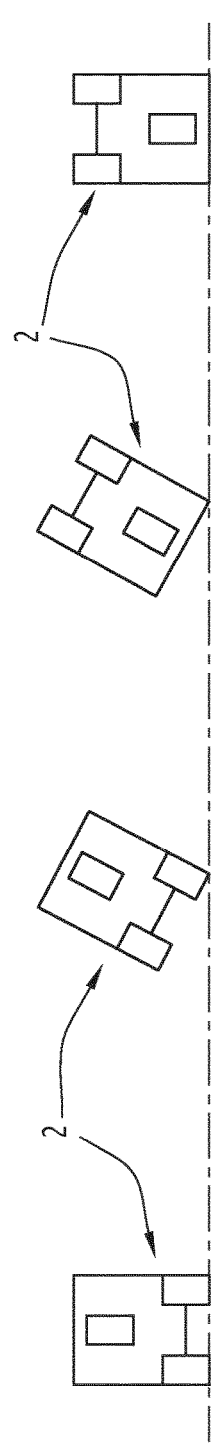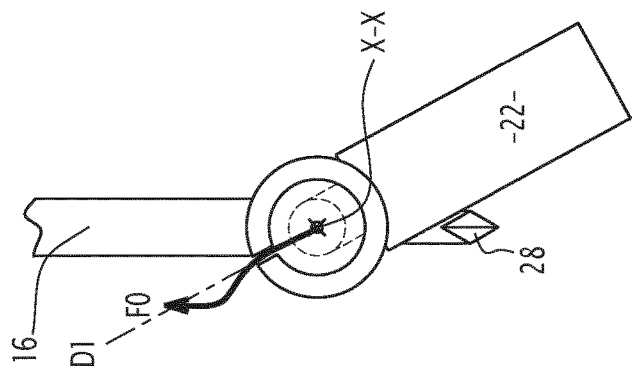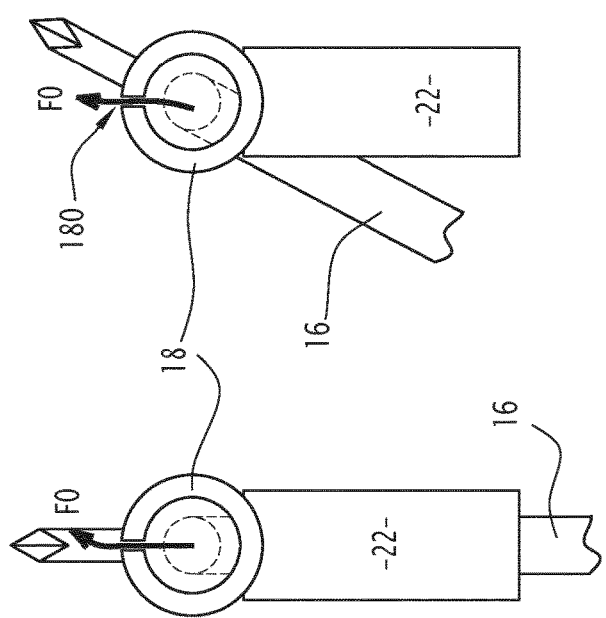

HYDROGEN DISCHARGE SYSTEM FOR A TRUCK AND TRUCK COMPRISING SUCH SYSTEM

This application is a 35 U.S.C. 371 national phase filing of International Application No. PCT/EP2017/075862, filed Oct. 10, 2017, the disclosure of which is incorporated herein by reference in its entirety.

The present invention concerns a hydrogen discharge system for a truck. This broadly covers light-duty, medium-duty and heavy-duty vehicles. In other words, this covers any road vehicle except passengers cars.

Electrochemical conversion cells, commonly referred to as fuel cells, produce electrical energy by processing reactants, for example, through the oxidation and reduction of hydrogen and oxygen. Hydrogen is a very attractive fuel because it is clean and can be used to produce electricity efficiently in a fuel cell. The automotive industry has expended significant resources in the development of hydrogen fuel cells as a source of power for vehicles. Indeed, vehicles powered by hydrogen fuel cells are said to be more efficient and generate fewer emissions than vehicles employing an internal combustion engine.

The hydrogen for the fuel cell is commonly stored in a lightweight, high-pressure vessel. Vehicles storing compressed hydrogen require Pressure Relief Devices (PRD). The PRD is in fluid communication with the interior of the vessel and is configured to vent the vessel gas when activated. Activation of the PRD occurs in response to an emergency, for example, in the case of an accident. Activation of the TPRD allows the vessel gas to be released from the system.

According to European standards, the hydrogen gas discharge from the pressure relief device shall not be directed:

(a) towards exposed electrical terminals, exposed electrical switches or other ignition sources;

(b) into or towards the vehicle passenger or luggage compartments;

(c) into or towards any vehicle wheel housing;

(d) towards any class 0 component;

(e) forward from the vehicle, or horizontally from the back or sides of the vehicle.

Hence, the preferred direction for hydrogen discharge is usually towards the top. One can easily design a hydrogen discharge system with a vent oriented upwards relative to the ground. However, if the vehicle rolls over, hydrogen can be discharged in direction of the ground and/or on the side of the vehicle, which is not in line with European standards. In particular, in case of an accident, the vehicle is liable to be tilted to the side or up-side-down. In such a case the hydrogen discharge would be directed towards the side or towards the ground, respectively. This increases the risks related to hydrogen discharge because the discharged hydrogen is liable to catch fire, resulting in a large jet flame. A flame directed to the side or to the ground is liable to cause greater damage and prevent the work of fire-fighters or rescue teams.

It is an object of the present invention to propose a hydrogen discharge system that overcomes the above disadvantages.

To this end, the invention concerns a hydrogen discharge system according to claim 1.

A hydrogen discharge system is for example known from JP 2007 106262. However, such system is designed for a passengers car. It comprises a pressure relief device functioning as a safety valve for releasing hydrogen gas when the temperature of the fuel tank exceeds a certain threshold. The pressure relief device is connected to a front end portion of a discharge pipe extending rearward of the vehicle body. The rear end portion of the discharge pipe is provided with a plurality of radial openings for venting hydrogen gas to the atmosphere. A cover with a C-shaped cross section is rotatably mounted around the rear end portion and covers some of the radial openings. The end portions of the cover are each formed of a metal with a high density, meaning that the end portions of the cover always face the ground. Accordingly, the hydrogen is always vented downwards, even in case the vehicle rolls over.

US 2010/0276024 discloses, also for passengers cars, a valve apparatus to be connected to a hydrogen tank. The valve apparatus is connected with a safety valve device configured to, in response to a temperature increase of the hydrogen tank to or over a preset reference temperature, discharge the compressed hydrogen out of the tank. The safety valve device has a discharge pipe with a hydrogen discharge opening arranged to discharge the hydrogen to the outside. A discharge direction of hydrogen is adjusted to be diagonally backward down from the vehicle. Typically, a groove is formed on an edge of the discharge pipe and the discharge direction of hydrogen can be adjusted to a desired direction by inserting an adequate tool into the groove and rotating the discharge pipe.

Thanks to the invention, if the vehicle rolls over, the vent of the deflector remains oriented upwards with respect to the ground. Accordingly, there is no risk of hydrogen release in direction of the ground or on one side of the vehicle. The hydrogen discharge system according to the invention is then safer than that of prior art. In addition, it fully complies with European standards.

Further features of the system, which are advantageous, but not compulsory, are defined in the claims.

The invention also concerns a truck.

Further features of the truck, which are advantageous, but not compulsory, are defined in the claims.

The invention will be better understood from reading the following description, given solely by way of one non-limiting example, and made with reference to the attached drawings in which:

FIGS. 2 and 3 are respectively front and side enlarged views of the hydrogen discharge system of FIG. 1;

Figure 1:
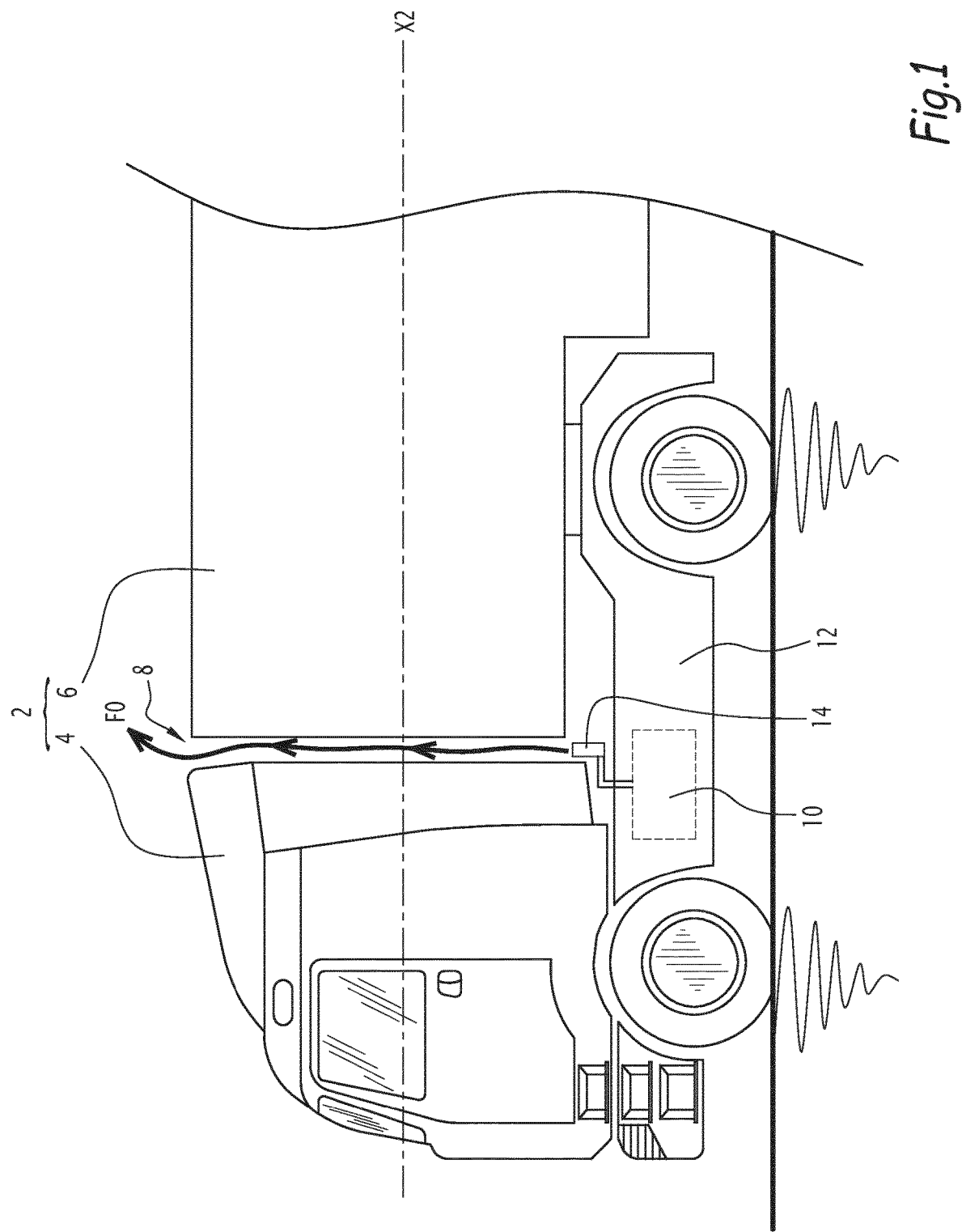
FIG. 1 is a partial and side view of a truck, comprising a hydrogen discharge system according to the invention.

FIGS. 4, 6, 8 and 10 are schematic front side views of the truck of FIG. 1, represented in four different configurations occurring when the truck rolls over; and FIGS. 5, 7, 9 and 11 represent front views of the hydrogen discharge system in the configurations of FIGS. 4, 6, 8 and 10 respectively.

FIG. 1 represents a truck 2 which is, in the example, a heavy-duty vehicle comprising a cab 4 and a body 6. In the example, the body 6 of the truck 2, which can also be referred to as the superstructure or the bodywork, is a trailer but one may envisage many different types of truck body, such a as refuse collector, a collecting container, etc. More generally, the body 6 of the truck designates the structure behind the cab 4, i.e. the structure that is supported or towed by the tractor truck from which the cab is part of.

Alternatively, the truck 2 may obviously be different from that represented on FIG. 1. In the meaning of the present paper, the term "truck" broadly covers light-duty, medium-duty and heavy-duty vehicles. In other words, any road vehicle, except passengers cars, can be assimilated to a truck. In particular, the truck may be a vacuum truck, a street sweeper, etc.

The truck 2 is a fuel cell vehicle, meaning that it uses hydrogen fuel cells as a source of power. With this respect, the truck 2 includes a hydrogen vessel 10, which is, in the example, mounted on the chassis 12 of the tractor unit. Nevertheless, the hydrogen vessel 10 may be placed otherwise, for example in the space 8 between the cab 4 and body 6. Besides, in practice, the truck 2 is preferably equipped with a plurality of hydrogen vessels. The hydrogen vessel is provided with a Pressure Relief Device (PRD) (not shown) for releasing compressed hydrogen in case of emergency, for example in case of an accident. In particular, the PRD automatically opens when the temperature and/or the pressure inside the vessel 10 increases over a predetermined threshold. Alternatively, the PRD may be controlled to switch in open configuration when a crash is detected, in a similar manner to airbags. Typically, accelerometers may be used to detect a crash and trigger the switching of the PRD in open configuration when a high deceleration is detected.

The truck 2 includes a hydrogen discharge system 14 provided downstream of the pressure relief device on the path of hydrogen when hydrogen is released from vessel 10. The hydrogen discharge system 14 can be mounted independently on the truck 2, meaning that the hydrogen discharge system 14 may be considered as a spare part.

The system 14 cannot be arranged anywhere on the truck. In practice, the most appropriate space for receiving the discharge system is the space 8 between the cab 4 and the body 6. Indeed, the cab is not appropriate to route hydrogen pipes as it is often tiltable relative to the chassis and the body 6 is not of truck Original Equipment Manufacturer (OEM) responsibility and thus not appropriate to route hydrogen pipes. Alternatively, the cab 4 may be fixed relative to the chassis.

Accordingly, the hydrogen discharge system 14 is advantageously arranged in the space 8 between the cab 4 and the body 6. This system 14 is designed for always orienting the jet of hydrogen upwards relative to the ground when the vessel 10 is vented, i.e. when the PRD opens, for example in the event of an accident.

The system 14 includes a pipe 16 comprising a first longitudinal end (not represented) that is connected to the PRD. The pipe 16 is provided with one discharge opening 162, which is preferably a radial opening. This means that the discharge opening 162 is different from the openings provided at the two longitudinal ends of the pipe. In practice, the pipe 16 is provided with a plurality of radial discharge openings 162, for example regularly distributed on the periphery of the pipe.

Preferably, the pipe 16 is a pipe elbow comprising a first pipe portion 160 delimiting the discharge opening 162 and a second pipe portion 164 forming a right angle with the first pipe portion 160. The second pipe portion 164 is connected to the PRD of the hydrogen vessel 10.

Advantageously, the system 14 comprises a bracket 26 that is secured to the pipe 16. More precisely, the bracket 26 is a L-shaped bracket comprising two parts 26.1 and 26.2 forming together a right angle. The part 26.1 is secured to the second longitudinal end 166 of the pipe 16, i.e. to the pipe end 166 opposed to that connected to the PRD. In addition, the part 26.2 of the bracket 26 is secured to the second portion 164 of the pipe 16, meaning that there are two different fixation zones.

In the example, the bracket 26 includes an attachment means 260, for example for attaching the bracket 26 to the chassis of the truck. In particular, the attachment means 260 is arranged on the bracket part 26.2.

The system 14 further includes a deflector 18, that is rotatably mounted with respect to the pipe 16 and that includes a vent 180, or outlet opening, for venting hydrogen exiting through the discharge opening(s) 162 of the pipe 16. The function of component 18 is to deflect the flow of hydrogen exiting from the discharge opening(s) 162, that is why it is referred to as a deflector.

On FIG. 3, axis X-X denotes the rotation axis of the deflector 18 relative to the pipe 16. Typically, the axis X-X remains horizontal, even when the vehicle is tilted or rolls over to the side. In other words, axis X-X remains parallel to the ground. Therefore, the rotation axis X-X is parallel to the longitudinal axis X2 of the truck (length direction), meaning that hydrogen is necessarily released in a plane that is perpendicular to the longitudinal direction of the truck and that there is no risk of releasing hydrogen in direction of the cab 4 or of the body 6.

Advantageously, the vent 180 has a specific shape designed for reducing the rotational torque arising from the hydrogen discharge jet. Typically, the vent 180 is a radial opening relative to axis X-X. Accordingly, vent 180 extends in a specific direction D1 that is radial to axis X-X, i.e. that is perpendicular to axis X-X and intersecting axis X-X. The same definition is applicable to discharge opening(s) 162.

The vent 180 is then designed to obtain a hydrogen jet ejected radially with respect to X-X axis. The resulting force applied by the hydrogen jet does not apply any rotational torque. The parallelism of the direction D1 with an axis radial to axis X-X is designed with tight tolerances so that any misalignment of the resulting force will not result in a torque higher than the balancing torque of the counterweight 22.

In addition, the deflector is made of a resistant material, such as stainless steel, aluminum, composite material, and in particular fibers reinforced composite material, so as to limit deformation(s) of the vent 180 in the event of a shock.

Preferably, during operation, the vent 180 is closed off with a removable plug 20 that prevents from soiling. The removable plug 20 is automatically ejected under the hydrogen pressure inside the deflector 19, as illustrated by arrow F1 on FIG. 3. Typically, the plug 20 protects the vent 180 against blockage, e.g. by dirt, ice, and ingress of water.

A balancing weight 22 is secured to the deflector 18 for stabilizing the deflector 18 in a predetermined orientation with respect to the ground, i.e. in a terrestrial reference frame. The balancing weight 22 may be attached to the deflector 18 or integral with the deflector 18. In the example, the balancing weight 22 is protected by the bracket 26 so that it can always freely rotate.

Typically, the balancing weight 22 maintains the deflector 18 in a configuration wherein the vent 180 is facing upwards with respect to the ground. Accordingly, if the truck 2 rolls over, the vent 180 of the deflector 18 remains oriented upwards with respect to the ground, in order to discharge hydrogen upwards relative to the ground.

Therefore, there is no risk of hydrogen release in direction of the ground or on one side of the vehicle. This is in particular visible on FIGS. 5, 7, 9 and 11, representing the configuration of the hydrogen discharge system 14 when the truck 2 rolls over. Typically, it can be seen on FIGS. 7, 9 and 11 that when the truck 2 is tilted to the side or up-side-down, the pipe 16 and bracket 26 rotate relative to the ground. However, the balancing weight deflector 18 remains in a configuration wherein the vent 180 is facing upwards with respect to the ground. Accordingly, hydrogen is released upwards, as represented by arrows F0 on FIGS. 1, 5, 7, 9 and 11.

Further, when the truck 2 is in the configuration of FIGS. 4 and 5, the attachment means 260 of the system 14 is in the axis of the hydrogen discharge jet, which enables to sustain the pressure arising from hydrogen release. In other configurations, typically in the configurations of FIGS. 6, 8 and 10, the balancing weight 22 is calculated so as to compensate the rotational torque arising from the misalignment between the hydrogen discharge jet and the attachment means 260.

Advantageously, the system 14 further comprises a mechanical stop 28 for preventing the balancing weight 22 from making a full rotation around the pipe 16. Typically, the mechanical stop 28 is formed at the free end of the bracket part 26.1. In particular, the mechanical stop 28 is integral with the bracket 26.

The mechanical stop 28 enables preventing the balancing weight 22 from being driven in rotation around the pipe by inertial forces. Typically, the balancing weight 22 shall not make a full rotation around the pipe 16 when the truck 2 tilts to the side, for example when the vehicle moves on a road with a crossfall, or when the vehicle rolls over (accident). In other words, the balancing weight shall not be caught in perpetual rotation due to inertia.

In the meaning of the present document, an upward direction does not necessarily mean a vertical direction. Typically, an upward direction may be inclined relative to the vertical direction, for example of 45°. Therefore, in the configuration of FIGS. 10 and 11, wherein the truck 2 is completely flipped over, the balancing weight 22 hits the mechanical stop 28, and slightly rotate relative to the ground. However, the deflector 18 remains in a configuration wherein the vent 180 is facing upwards relative to the ground, meaning that hydrogen discharged through the vent 180 does not project to the side of the vehicle or in direction of the ground. It is to be noted that the angle in FIG. 11 between the hydrogen release direction and the vertical direction could be reduced by modifying the geometry of the balancing weight 22 and/or of the mechanical stop 28. Typically, one may reduce the width of the balancing weight 22 or increase the length of the bracket part 26.1.

Preferably, the deflector 18 is a cylindrical box comprising two opposed through-holes, among which at least one of them, preferably each one of them, receives the pipe 16.

In particular, the pipe portion 160 extends through the holes of the box, meaning that the discharge opening(s) 162 open(s) inside the deflector 18, i.e. inside the internal volume of the box forming the deflector 18 (See arrow F2 on FIG. 3).

The pipe portion 160 and the holes of the deflector 18 are of circular shape, enabling the pipe portion 160 to rotate relative to the deflector 18 around axis X-X. Accordingly, deflector 18 can be compared to some kind of bearing.

Typically, the system 14 further includes mechanical stops 24a and 24b, provided on both sides of the box, for preventing the box, i.e. the deflector 18, from moving in translation along the pipe 16.

In a non-represented alternative embodiment, a damping member is used to damp the rotation of the deflector 18 relative to the pipe 16 and avoid excessive oscillation of the vent 180. The damping member is preferably a hydraulic damper, wherein the rotating part is at least partially immersed in an oil sump. This means that, in the example, the balancing weight 22 may be at least partially immersed in an oil sump. Accordingly, the oil provides a resistant torque, whose amplitude may be adjusted by increasing or lowering the oil level inside the oil sump.

The features of the depicted embodiment and non-represented alternative embodiments can be combined together to generate new embodiment(s) of the invention.

The invention claimed is:

1. A hydrogen discharge system for a truck, the system comprising:
    a pipe provided with at least one discharge opening,
    a deflector rotatably mounted with respect to the pipe and including a vent for venting hydrogen exiting through the discharge opening, and
    a balancing weight secured to the deflector to maintain the deflector in a configuration wherein the vent is facing upwards with respect to the ground to discharge hydrogen upwards relative to the ground.

2. The hydrogen discharge system of claim 1, further comprising a mechanical stop for preventing the balancing weight from making a full rotation around the pipe.

3. The hydrogen discharge system of claim 2, wherein the mechanical stop is integral with a bracket of the system.

4. The hydrogen discharge system of claim 1, wherein the discharge opening of the pipe is a radial opening.

5. The hydrogen discharge system of claim 1, wherein the deflector is a cylindrical box comprising two opposed holes, and at least one of the two opposed holes receives the pipe.

6. The hydrogen discharge system of claim 1, further comprising a bracket secured to the pipe.

7. The hydrogen discharge system of claim 6, wherein the bracket is secured to a longitudinal end of the pipe.

8. The hydrogen discharge system of claim 6, wherein the pipe is a pipe elbow comprising a first pipe portion delimiting the discharge opening and a second pipe portion forming a right angle with the first pipe portion and in that the bracket is secured to the second pipe portion of the pipe.

9. The hydrogen discharge system according to claim 6, wherein the bracket is L-shaped.

10. The hydrogen discharge system of claim 1, wherein the vent is closed off with a removable plug.

11. The hydrogen discharge system of claim 1, further comprising mechanical stops for preventing the deflector from moving along the pipe.

12. The hydrogen discharge system of claim 1, wherein the vent extends radially with respect to a rotation axis of the deflector.

13. A truck comprising a hydrogen discharge system, the hydrogen discharge system comprising:
    a pipe provided with at least one discharge opening,
    a deflector rotatably mounted with respect to the pipe and including a vent for venting hydrogen exiting through the discharge opening, and
    a balancing weight secured to the deflector to maintain the deflector in a configuration wherein the vent is facing upwards with respect to the ground to discharge hydrogen upwards relative to the ground.

14. The truck of claim 13, further comprising a cab and a body, wherein the hydrogen discharge system is arranged between the cab and the body.

15. The truck of claim 13, wherein a rotation axis of the deflector relative to the pipe is parallel to a longitudinal axis of the truck.

* * * * *